INVENTORS
JOSEPH J. OSPLACK &
BY RODMAN J. OSPLACK

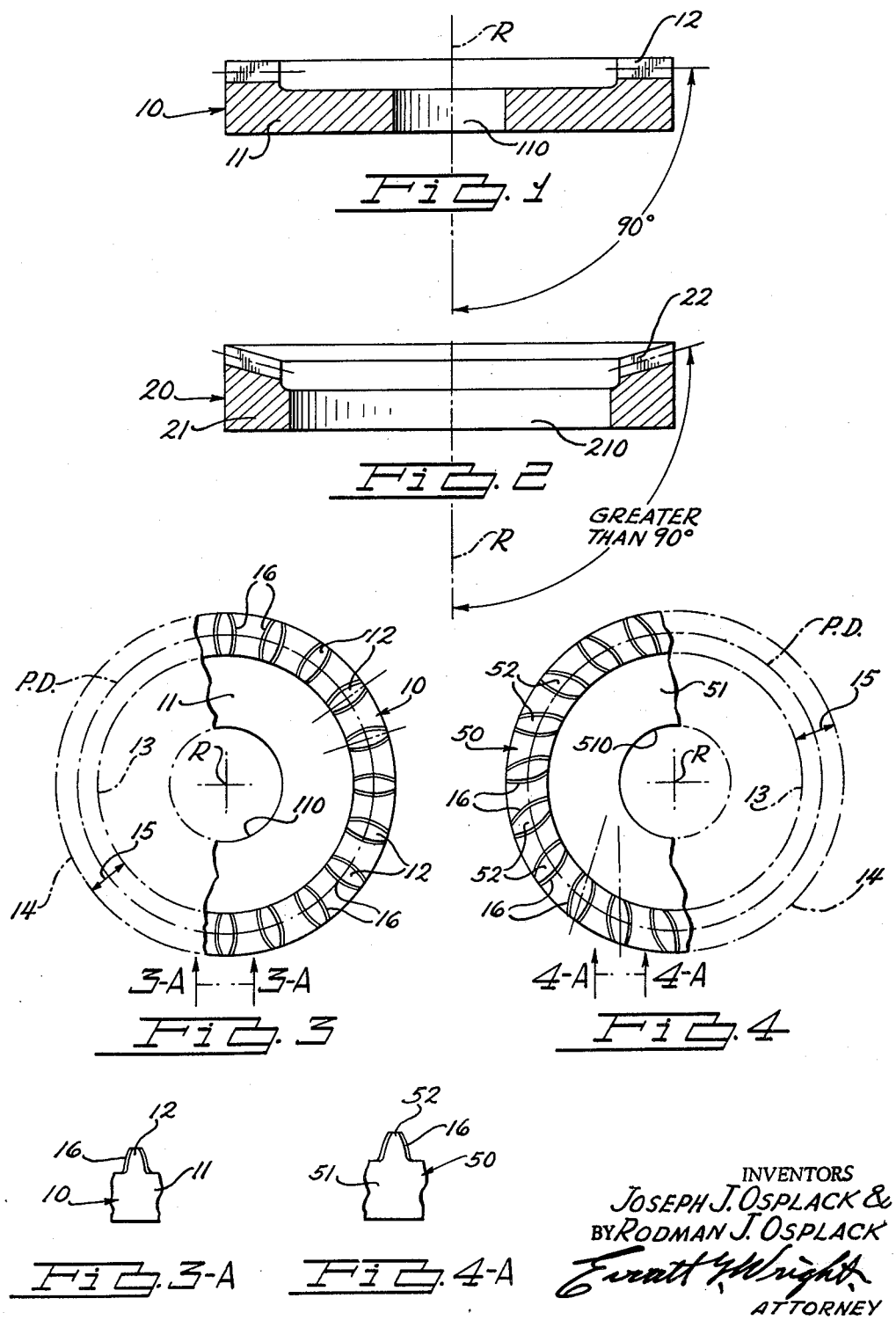

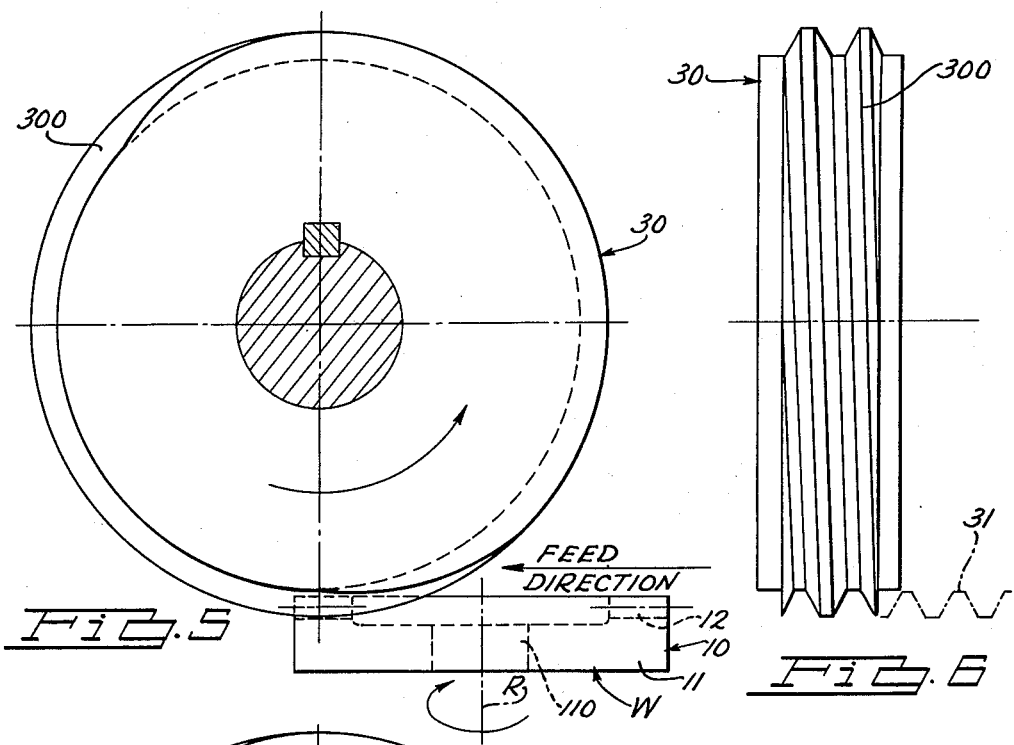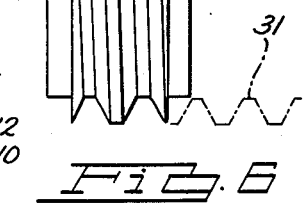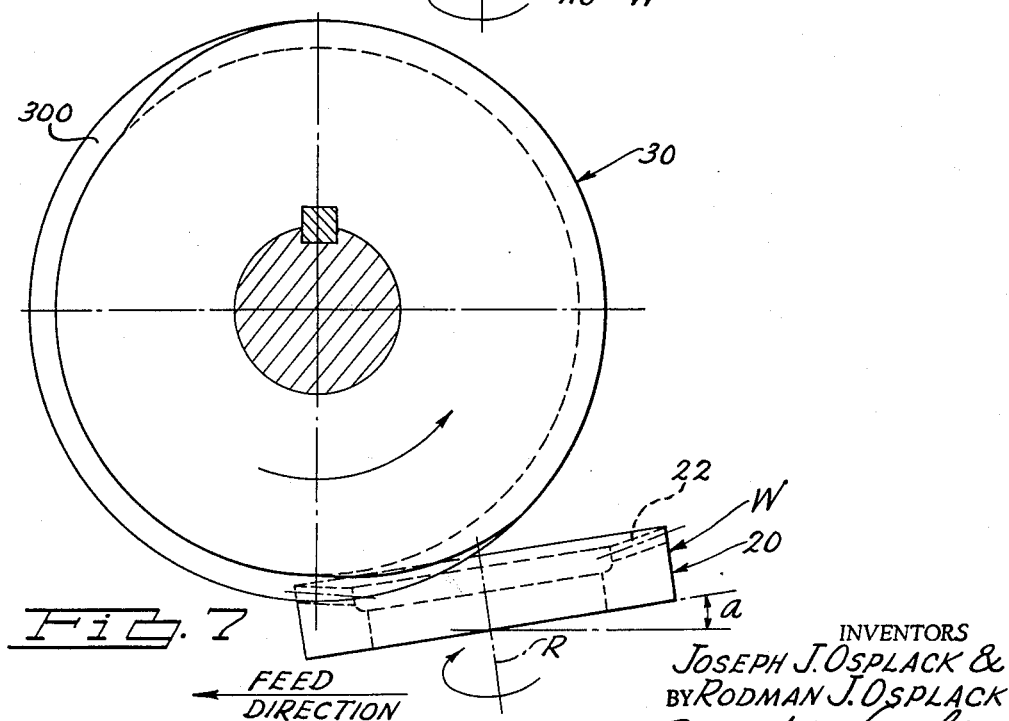

ATTORNEY

INVENTORS
JOSEPH J. OSPLACK &
BY RODMAN J. OSPLACK

ATTORNEY

United States Patent Office 3,184,988
Patented May 25, 1965

3,184,988
INVOLUTE FACE GEARING AND INVOLUTE INTERNAL CONICAL GEARING
Joseph J. Osplack, 14001 Piedmont, and Rodman J. Osplack, 15367 Vaughan, both of Detroit, Mich.
Filed Feb. 12, 1963, Ser. No. 257,896
8 Claims. (Cl. 74—457)

This application relates to involute face gears and involute internal conical gears and the method of producing the same.

Conical involute gears of both spur and helical types are well known in the prior art, such gears being formed with relatively large external cone angles on right circular cones. However, this invention is directed to involute gears formed on a face plane and internally on a right circular cone. The instant invention extends all of the advantages known to exist in right circular conical involute gears to involute face gears and to involute internal conical gears; the said involute face gears and involute internal conical gears and the method of producing the same embodying new concepts which heretofore have been considered impossible or impractical to attain.

With the foregoing in view, it is the primary object of this invention to provide gears and gear trains for highly accurate transmission of motion and for face to face meshing for such use as in highly accurate indexing mechanisms.

Another object of the invention is to provide involute face gearing and involute internal conical gearing and methods of producing the same in mass production with great accuracy and to the selected barrel shape of the barrel-shaped teeth.

A further object of the invention is to provide usable involute face gearing and involute internal gearing produced by a generating process in which the barrel shape of the gear teeth is selected and controlled to incorporate in the finished gear barrel-shaped teeth of a selected design.

Other objects of the invention will become apparent by reference to the following detailed description taken in connection with the accompanying drawings, in which:

FIG. 1 is a cross sectional view of an involute face gear of the invention.

FIG. 2 is a cross section view of an involute internal conical gear of the invention.

FIG. 3 is a top plan view of the gear teeth of the involute face gear shown in FIG. 1; the top plan view of the gear teeth of the involute internal conical gear shown in FIG. 2 being similar.

FIG. 3-A is a fragmentary elevational view taken on the line 3-A—3-A of FIG. 3.

FIG. 4 is a top plan view similar to FIG. 3 except the gear teeth are helically disposed.

FIG. 4-A is a fragmentary elevational view taken on the line 4-A—4-A of FIG. 4.

FIG. 5 is a more or less diagrammatic view indicating the timed generation of an involute face gear.

FIG. 6 is an elevational view of a gear generating tool indicated as a thread grinding wheel, the said thread grinding wheel having a diametrical pitch and pressure angle equivalent to the theoretical rack of the gear to be formed thereby.

FIG. 7 is a more or less diagrammatic view similar to FIG. 5 except that it indicates the timed generation of an involute internal conical gear.

FIGS. 8, 9, 10, 11 and 12 are diagrammatic views showing gear trains employing an involute face gear in rolling mesh respectively with a spur gear, a rack, a conical involute gear, a worm, and a helical gear.

Figure 8:
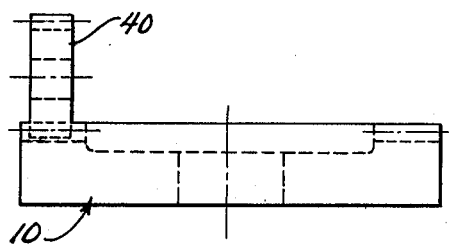
Figure 11:
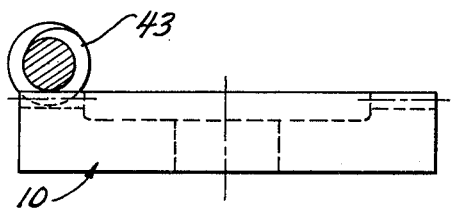
Figure 9:
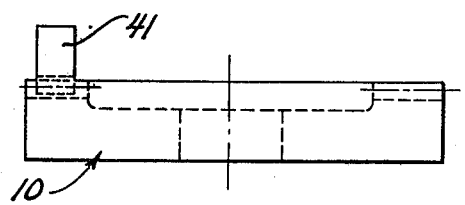
Figure 12:
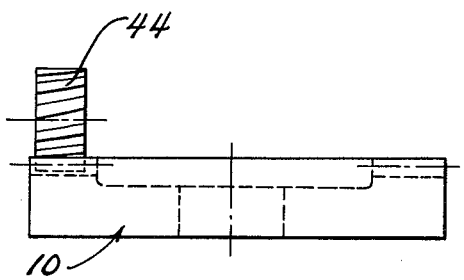
Figure 10:
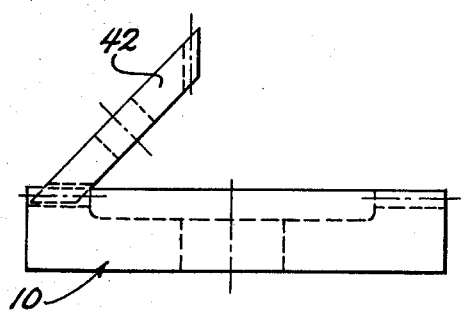
Figure 13:
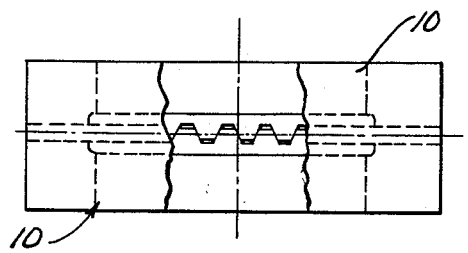
Figure 14:
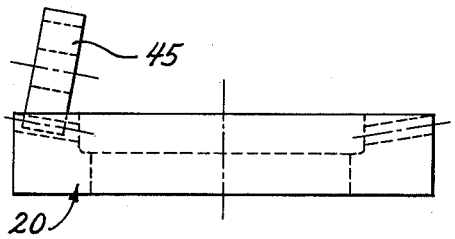
Figure 17:
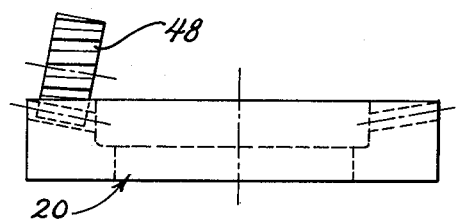
Figure 15:
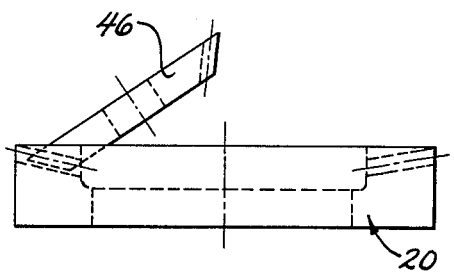

FIG. 13 is a diagrammatic view showing a pair of involute face gears of the invention in face to face mesh.

FIGS. 14, 15, 16 and 17 are diagrammatic views showing gear trains employing an involute internal conical gear in rolling mesh respectively with a spur gear, a conical involute gear, a worm, and a helical gear.

Figure 18:
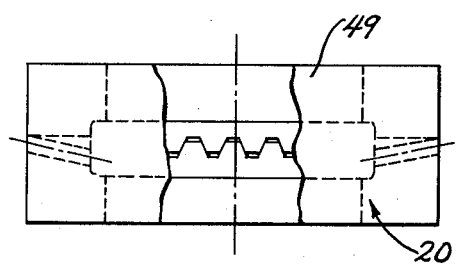
Figure 16:
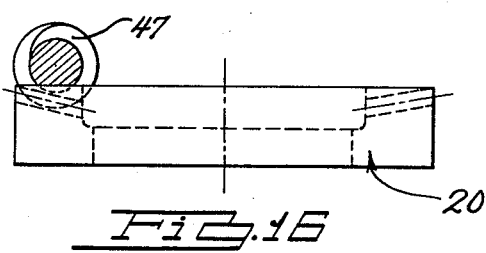

FIG. 18 is a diagrammatic view showing an involute internal conical gear in face to face mesh with a conical involute gear.

Referring now to the drawings wherein like reference characters refer to like and corresponding parts throughout the several views, an involute face gear 10 of the invention is shown in cross section in FIG. 1, and consists of a gear disc or blank 11 centrally apertured at 110 on its axis of rotation R. The gear disc 11 is provided on its face with a plurality of evenly spaced radially disposed barrel-shaped involute teeth 12. The teeth 12 of the said involute face gear 10 are disposed ninety degrees with respect to the axis of rotation R thereof.

FIG. 2 is a cross sectional view of an involute internal conical gear 20 of the invention which is like and similar to the involute face gear shown in FIG. 1 except that the gear disc or blank 21 is provided with a large central aperture 210, and the gear disc 21 is provided on its internal conical face with a plurality of evenly spaced radially disposed barrel-shaped involute teeth 22. The teeth 22 of the said involute internal conical gear 20 are always disposed at an angle greater than ninety degrees with respect to the axis R of rotation thereof.

The top view of a typical involute face gear 10 is shown diagrammatically in FIG. 3, and an end elevation of an involute tooth of the face gear 10 is indicated in FIG. 3-A. The inside diameter of the involute teeth 12 is indicated at 13 and the outside diameter thereof is indicated at 14. The face width of the involute face gear 10 is the radial distance 15 between the inside diameter 13 and outside diameter 14 of the involute teeth 12. The pitch diameter of the said involute face gear 10 is indicated by the dot and dash line P.D.

The top view of a typical helical involute face gear 50 is shown diagrammatically in FIG. 4 which is like and similar to the top view of the involute face gear 10 shown in FIG. 3, the only difference being the angular disposition of the involute teeth 52 of the helical involute face gear 50 as distinguished from the radial disposition of the involute teeth 12 of the involute face gear 10. The gear disc 51 of the involute face gear 50 is suitably apertured at 510. An end elevation of a helical involute tooth 52 of the helical involute face gear 50 is indicated in FIG. 4-A.

Tooth layout and formations for the involute teeth 22 of an involute internal conical gear 20 shown in FIG. 2 is like and similar to that disclosed in FIGS. 3 and 3-A for the involute teeth 12 of an involute face gear 10, except that the teeth 22 of the involute internal conical gear 20 are disposed on an angle greater than ninety degrees in respect to the axis of rotation R thereof.

Obviously, a helical internal conical gear of the invention, not shown, would be the same general construction as the involute internal conical gear 20 shown in FIG. 2 except that the gear teeth thereof would be disposed on an angle similar to that of the gear teeth 52 of the helical involute face gear 50 shown in FIG. 4.

Referring now particularly to more or less diagrammatic FIGS. 5 and 6, the work W which is illustrated as being an involute face gear 10 is having its involute gear teeth 12 formed by timed generation such as employed in gear hobbing machines, in gear hobbing-grinders, and the like. In FIGS. 5 and 6 the involute gear teeth 12 are being formed by a grinding wheeel 30 which rotates at a suitable grinding speed in timed relationship to the turning of the work W as the work W is fed at the proper rate of speed across the threaded cutting surface of grinding wheel 30. The feed direction is parallel to the face of the gear teeth 12. One pass of the work W in respect to the grinding wheel 30 completely forms all of the involute gear teeth 12 to a barrel shape as best shown in FIGS. 1, 3 and 3–A.

The grinding surface wheel 30 is spirally threaded at 300 to the form of the theoretical or basic rack 31 which is the basic rack of the finished involute gear teeth 12 in the face gear 10. In other words, the tooth generating process in the example herein set forth is the employement of a grinding wheel having threads 300 of a diametrical pitch and pressure angle equivalent to the theoretical or basic rack of the gear teeth to be formed.

Such a generating process as hereinabove described produces not only involute gear teeth 12 in the involute face gear 10 but produces the said involute teeth 12 with convex flanks 16, such teeth being known in the industry as barrel-shaped teeth. However, it is extremely important to control the extent of the convexity of the flanks of the barrel-shaped teeth 12. This is accomplished in the instant invention by suitably limiting number of convolutions of the threads 300 of the grinding wheel 30, the less the number of convolutions of the threads 300 of the grinding wheel 30, the flatter the convexity of the barrel-shaped teeth 12 and the greater the width of the end faces thereof. For example, one or even less than one convolution and seldom more than two convolutions of threads 300 in the grinding wheel 30 are employed to provide a desired small convexity of the flanks of barrel-shaped involute teeth 12; the general dimensions of the gear to be formed and the number and diametrical pitch of the involute teeth thereof are taken in consideration in determining the number of convolutions of the threads 300 on the grinding wheel.

In FIG. 7 is illustrated the production of an involute internal conical gear 20 of the invention by a similar method and means as hereinabove described for the production of an involute face gear of the invention. In FIG. 7, the work W, which is illustrated as an involute internal conical gear 20, is disposed on an angle "a" with respect to the plane of the feed motion equivalent to the angle of the teeth 22 of the finished involute internal conical gear 20 less 90 degrees.

Helical involute face gears 50 as well as helical involute internal conical gears of the invention may be produced by like processes as hereinbefore described; however, the travel of the center of the work W would be off center in respect to the cutting surfaces of the grinding wheel 30 rather than centrally across the cutting surfaces of the grinding wheel 30.

Obviously the translatory movement of the work W with respect to the grinding wheel 30 in the illustrative examples hereinabove given may be a translatory movement of the grinding wheel 30 with respect to the work W.

It is also obvious that involute gearing of the invention having barrel shaped teeth formed to a basic rack form will have a point contact with any other gear with which it is meshed.

FIGS. 8–18 inclusive are indicative of a number of different types of gear trains in which involute face gears and involute conical gears of the invention are employed in use with another gear, the gears of each gear train being conjugate and formed to the same theoretical or basic rack.

In FIGS. 8, 9, 10, 11 and 12 are shown gear trains each consisting of an involute face gear 10 operatingly meshed respectively with a spur gear 40, a rack 41, a conical involute gear 42, a worm gear 43, and a helical gear 44.

FIG. 13 shows a pair of involute face gears 10 in face to face mesh as, for example, when used in index mechanisms, clutches, and the like.

In FIGS. 14, 15, 16 and 17 are shown gear trains each consisting of an involute internal conical gear 20 operatively meshed respectively with a spur gear 45, a conical involute gear 46, a worm gear 47, and a helical gear 48.

FIG. 18 shows an involute internal conical gear 20 in face to face mesh with an involute external conical gear 49.

Thus, FIGS. 8 to 18 are illustrative of but not limited to the use of involute face gears and involute internal conical gears of the invention with other gears and with each other. It is obvious to those skilled in the art that a similar broad application and use exists for helical involute face gears and helical involute internal conical gears of the invention.

Involute face gearing and involute internal conical gearing of the invention produced in accordance with the invention is susceptible to manufacture with a high degree of accuracy not possible with other types of gearing which it may replace. This is because gearing of the invention is involute and conjugate to a basic rack, and may be checked by known methods of checking involute gearing. Furthermore, the instant invention opens up new uses for involute face gearing and involute internal conical gearing not heretofore deemed desirable or practical.

Although but several embodiments and applications of use of gearing embodying the invention have been disclosed and described herein in detail, it is obvious that many modifications may be made in involute face gears and involute internal conical gears of the invention and in methods of producing the same, all without departing from the spirit and scope of the invention as defined by the appended claims.

We claim:

1. An involute face gear having barrel-shaped teeth formed in a circular plane 90 degrees in respect to its axis of rotation, said teeth being conjugate to a basic rack form, said gear having point contact with any gear with which it is mated.

2. An involute helical face gear having barrel-shaped teeth formed in a circular plane 90 degrees in respect to its axis of rotation, said teeth being conjugate to a basic rack form, said gear having point contact with any gear with which it is mated.

3. An involute internal conical gear having barrel-shaped teeth formed in a circular plane greater than 90 degrees in respect to its axis of rotation, said teeth being conjugate to a basic rack form, said gear having point contact with any gear with which it is mated.

4. A helical involute internal conical gear having barrel-shaped teeth formed in a circular plane greater than 90 degrees in respect to its axis of rotation, said teeth being conjugate to a basic rack form, said gear having point contact with any gear with which it is mated.

5. A pair of involute face gears having involute barrel-shaped teeth, said gears being in face to face mesh on a common axis of rotation, said gear teeth being formed conjugate to a basic rack and in point to point contact when meshed.

6. Intermeshing gears consisting of one involute internal conical gear having barrel-shaped teeth and one involute external conical gear, the teeth of both being conjugate to the same basic rack.

7. A gear train consisting of one involute face gear having barrel-shaped teeth formed conjugate to a basic rack in a plane 90 degrees in respect to its axis of rotation operatively meshed with any gear conjugate to the same basic rack.

8. A gear train consisting of one involute internal conical gear having barrel-shaped teeth formed conjugate to a basic rack in a circular plane greater than 90 degrees in respect to its axis of rotation in mesh with any gear conjugate to the same basic rack.

References Cited by the Examiner

UNITED STATES PATENTS

| | | | |
|---|---|---|---|
| 618,272 | 1/99 | Johnson | 74—462 |
| 1,324,287 | 12/19 | Williams | 74—462 |
| 1,626,820 | 5/27 | Head | 74—459.5 |
| 2,558,203 | 6/51 | Wildhaber | 74—462 X |
| 2,638,011 | 5/53 | Smith | 74—462 |
| 2,711,673 | 6/55 | Miller | 90—4 |
| 2,731,886 | 1/56 | Saari | 90—4 |
| 2,824,556 | 2/58 | Bateman | 51—287 X |
| 2,974,534 | 3/61 | Clickner | 74—457 X |

FOREIGN PATENTS 513,329  10/39  Great Britain.

OTHER REFERENCES

German printed application 1,051,597, Feb. 26, 1959.

DON A. WAITE, *Primary Examiner.*